United States Patent [19]

Lindahl

[11] Patent Number: 4,464,672

[45] Date of Patent: Aug. 7, 1984

[54] ELECTROGRAPHIC RECORDING APPARATUS

[75] Inventor: Richard W. Lindahl, Hudson, Wis.

[73] Assignee: Minnesota Mining and Manufacturing Company, St. Paul, Minn.

[21] Appl. No.: 388,584

[22] Filed: Jun. 15, 1982

[51] Int. Cl.[3] .............................................. G01D 15/06

[52] U.S. Cl. .................................. 346/153.1; 118/639

[58] Field of Search ..................... 346/150, 153.1, 155; 118/639

[56] References Cited

U.S. PATENT DOCUMENTS

| | | | |
|---|---|---|---|
| 4,112,156 | 9/1978 | Swackhamer | 118/639 X |
| 4,316,198 | 2/1982 | Erickson | 346/153.1 X |
| 4,402,000 | 8/1983 | Fabel et al. | 346/155 |

*Primary Examiner*—Thomas H. Tarcza

*Attorney, Agent, or Firm*—Donald M. Sell; James A. Smith; Robert L. Marben

[57] ABSTRACT

Electrographic apparatus providing electrographic stylus recording using magnetically attractable toner powder supplied to a recording region while electrical signals are applied to styli to deposit toner powder onto a receptor recording member. At least one side of the stylus array has a rotatable sleeve member with an enclosed magnet disposed near the stylus array to remove excess toner powder that is magnetically drawn from the recording region. A toner removal means removes toner powder drawn to the sleeve member for return to a toner powder hopper. The toner removal means can be a stationary sleeve within which a rotatable magnetic assembly is carried. The stationary sleeve is positioned near the rotatable sleeve to remove toner powder that is carried by the rotatable sleeve. Toner powder is directed to a flange on the stationary sleeve and, then, to a pathway providing for return of the toner powder to the toner powder hopper. The toner removal means can also be a magnetic shunt member for the magnet and/or a blade member positioned near the rotatable sleeve member.

8 Claims, 3 Drawing Figures

ELECTROGRAPHIC RECORDING APPARATUS

BACKGROUND OF THE INVENTION

The invention presented herein relates to electrographic stylus recording apparatus which involves the supply of toner powder from a hopper to a recording region between a stylus electrode and a receptor recording member as electrical signals are selectively applied to the stylus and, in particular, to apparatus for removing excess toner powder from the recording region and receptor recording member for return to the toner powder hopper.

U.S. patent application Ser. No. 269,069, filed June 2, 1981, now U.S. Pat. No. 4,402,000, a continuation patent application of U.S. patent application Ser. No. 22,859, filed Mar. 29, 1979, (now abandoned) by G. W. Fabel et al, discloses an electrographic apparatus for maintaining a controlled quantity of magnetically attractable, electronically conductive toner powder in a recording region formed between an array of stylus electrodes and a receptor recording member which makes electronic contact with a grounding electrode. A regular or relatively uniform supply of toner powder is provided from a supply of toner powder in a hopper to the recording region where a magnetic force is presented which acts on the toner to establish an electronically conductive path via the toner between the stylus electrodes and the recording member. Recording electrical potential signals are selectively applied to the stylus electrodes relative to the grounding electrode to cause toner to be deposited on the recording member as image toner. The apparatus provides for removal of excess accumulated toner from the recording gap, with such toner returned to the toner supply. The patent application teaches the use of a magnetic member disposed at the stylus electrode to provide the magnetic force mentioned above which also acts to draw excess accumulated toner away from the recording gap. It is indicated that the toner drawn to the magnetic member can be removed by a vacuum pull-off system, with such toner then being available for reuse. Mechanical augers and belt skiving mechanisms are other approaches indicated for removing such toner from the magnets for reuse. Such arrangements for removing the toner are overly complex and have been found to be abrasive on the toner. Such arrangements for removing toner limit the extent to which the toner can be used repeatedly when the apparatus is used to produce unfixed or non-permanent toner images which are not transferred from the receptor recording member.

SUMMARY OF THE INVENTION

The invention presented herein is an improvement to the prior electrographic apparatus which uses magnetically attractable, electronically conductive toner powder and includes first and second electrodes in spaced opposing relationship with a receptor recording member spaced from the first electrode to provide a recording region between the first electrode and the receptor recording member. The receptor recording member is adapted for making electronic contact with the second electrode and for movement past the first electrode. A hopper is provided for holding a supply of toner powder from which a regular or relatively uniform supply of toner is provided to the recording region. At least one magnet is disposed adjacent the first electrode to provide a magnetic field at the first electrode serving to attract toner powder toward the first electrode and also attract toner powder presented adjacent the recording region toward the magnet. The improvement to such apparatus includes a sleeve or cylindrical member or nonmagnetic material disposed and adapted for rotation about the magnet with a toner powder removal means provided to remove toner powder from the sleeve member. By placing the first electrode above the hopper, the toner powder removal means will be positioned so the removed toner powder can fall by gravity to the hopper. In one embodiment, the toner removal means can be a blade member positioned adjacent the sleeve or a magnetic shunt member for the magnet within the sleeve or a combination of the blade member and the magnetic shunt member. In another embodiment, the toner powder removal means includes a second sleeve or cylindrical member of non-magnetic material positioned a short distance from the sleeve member that is disposed about the magnet. A magnet structure including a plurality of magnets is disposed within the second sleeve member and is adapted for rotation. The magnet structure within the second sleeve member attracts toner powder from the first-mentioned sleeve member to the second sleeve member and moves it over the surface of the second sleeve member. A flange means is spirally disposed at the outer surface of the second sleeve member and extends to at least one end portion of the second sleeve. Toner powder moves over the second sleeve in response to rotation of the plural magnet structure within the second sleeve causing it to be moved to and along the flange means. A pathway means is positioned between the toner powder hopper and the flange means at one end portion of the second sleeve to provide a pathway for toner powder brought to the flange means which serves to direct toner powder to the hopper as it falls by gravity from the flange means at one end portion of the second sleeve.

When the second sleeve member is positioned on the side of the first electrode that is downstream from the movement of the receptor recording member, it can also be positioned so it is close to the receptor recording member to cause the magnet structure within the second sleeve member to attract toner powder that is loosely carried by the receptor recording member to the second sleeve member so that only toner powder that presents an image will remain on the receptor recording member.

A third embodiment, which is preferred, combines the first and second embodiments wherein the magnet and the sleeve member of the first embodiment is positioned on the upstream side of the first electrode relative to the movement of the receptor recording member. Use of the second embodiment in the third embodiment includes positioning of the sleeve member and the enclosed magnet of the second embodiment on the downstream side of the first electrode with the second sleeve member and magnet structure of the second embodiment plus the flange means and pathway means utilized as described for the second embodiment.

BRIEF DESCRIPTION OF THE DRAWINGS

A better understanding of this invention including its novel features and advantages, will be obtained upon consideration of the following detailed description and the accompanying drawings wherein.

DETAILED DESCRIPTION

The invention presented herein involves an improvement made to a known electrographic recording apparatus which will be described before details of the present invention are set forth. In addition to the details to be given with respect to the known apparatus, additional details regarding the known apparatus, which may be of interest, are set forth in U.S. application Ser. No. 269,069, filed June 2, 1981, now U.S. Pat. No. 4,402,000, as mentioned earlier, and which is incorporated herein by reference.

Figure 1:
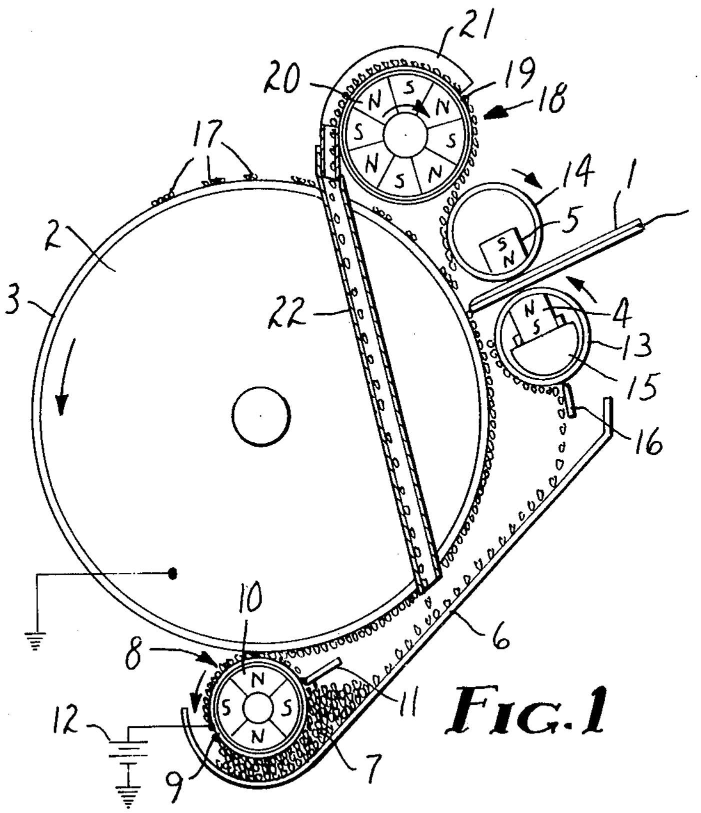
FIG. 1 is a diagrammatic showing of apparatus embodying the invention.
Figure 2:
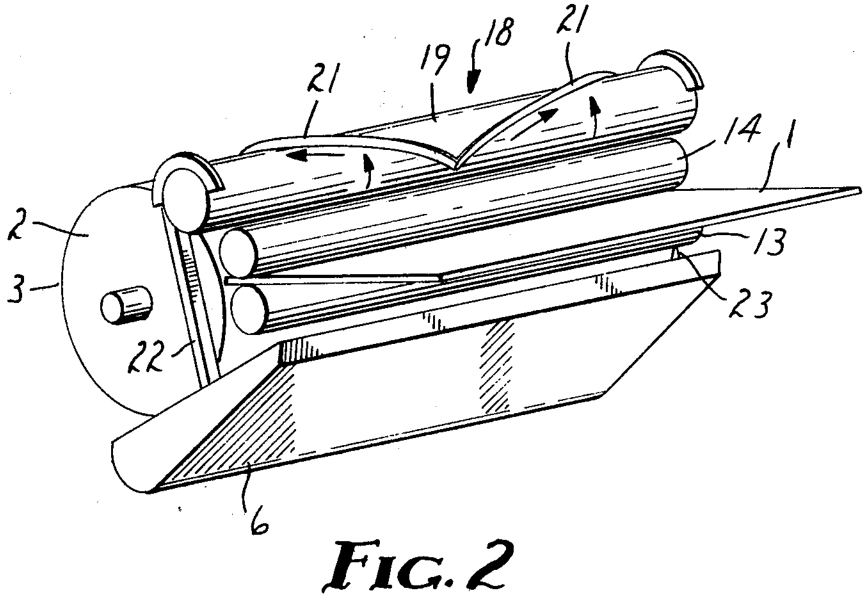
FIG. 2 is a perspective view of the apparatus of FIG. 1.

Referring to FIGS. 1 and 2 of the drawing, the apparatus shown, which is a preferred embodiment, includes a stylus recording electrode 1 having a portion spaced a short distance from a recording structure which includes a relatively electrically conductive electrode 2 that is connected to ground and a receptor recording member 3 in electronic contact with such electrode. The receptor recording member 3 is provided by a layer of dielectric material carried on the outer surface of an electronically conductive electrode 2, such as the drum shown. Drum 2 is adapted to move counterclockwise by a drive means, such as an electric motor (not shown). The recording structure can also take the form of a flexible, conductive belt on which a layer of dielectric material is provided. The receptor recording member 3 is spaced a relatively short distance from the recording electrode 1 to establish a recording region. The apparatus is usable with magnetically attractable, electronically conductive toner.

As can be seen in FIG. 2, the stylus electrode 1 is one of an array of spaced apart, parallel electrodes. The electrodes are of magnetically permeable material. A recording gap, i.e., the shortest distance between the ends of the stylus electrodes and the recording member 3 should, as a minimum, be at least equal to the diameter of the largest toner particle of the toner powder to be used. As a practical matter, the gap preferably should be large enough so that a plurality of toner particles forming at least one elongated toner chain-like aggregate can be accommodated in the gap thereby insuring a suitable electronically conductive path between the end of the electrodes of the stylus array and the surface of the recording member 3. At least one magnet is needed to provide a high magnetic field or force at the end of each of the electrodes in the stylus array and establish a magnetic field or force to attract excess accumulated toner powder in the recording region. The structure of FIG. 1 uses two magnets, which is preferred. A first magnet 4 is rigidly positioned adjacent to and on one side of the stylus electrode array with a second magnet 5, also rigidly positioned on the opposite side of the stylus array. A toner powder hopper 6 is provided in which a supply of magnetically attractable, electronically conductive toner 7 is received. A toner powder transport means 8 is positioned within the hopper 6 for providing a uniform or regular layer of the toner 7 to the recording member 3. The toner powder transport means 8 can be a magnetic roll type of toner applicator which includes an electronically conductive sleeve or cylinder 9 of non-magnetic material with a plurality of stationary magnets 10 positioned within the sleeve 9. The sleeve 9 is adapted for rotation in a counterclockwise position, as indicated in FIG. 1, and at a speed sufficient to supply toner powder to the receptor recording member 3. The toner powder 7 is metered onto the sleeve 9 by doctor blade 11 positioned a short distance from the outer surface of the sleeve 9. The sleeve 9 is electrically connected to a D.C. voltage source 12 which is of a magnitude sufficient to cause the toner powder presented between the sleeve 9 and recording member 3 to be electrically charged and adhere to the toner surface of the recording member 3 which, due to movement of the drum electrode 2, carries the toner 7 to the recording region presented between the stylus electrode 1 and the surface of the receptor recording member 3. The charge on the toner decreases by controlled charge leakage via the recording member 3 during the time the toner moves to the recording region. At the recording region, substantially all of the toner is moved from the surface of the recording member 3 by the magnetic force present at the recording region to form chain-like aggregates of toner which bridge the recording gap. The electrodes of the stylus array are selectively connected individually to sources (not shown) of recording electrical potentials capable of providing voltage pulses of suitable amplitude and duration and in accordance with a desired toner image. The toner particles are deposited onto the recording member 3 in an imagewise manner opposite the ends of the stylus electrodes to which recording electrical potential pulses have been applied. Such recorded image toner is bound to the surface of the recording member 3 by electrical forces which exceed the magnetic forces at the recording region. In this sense, this toner is again associated with the recording member 3 and moves with the recording member 3 out of the recording region as indicated by the toner at 17 upon further rotation of the drum electrode. When a stylus electrode is not supplied with recording electrical potential pulses, no toner is deposited in the areas of the recording member 3 opposite such electrode, i.e., the toner remains magnetically attracted toward such stylus electrode. Since not all toner powder brought to the recording region is deposited on and carried away from the recording region by the recording member 3, an excess of toner powder would be presented at the recording region unless some provision were made to remove the excess accumulated toner.

As mentioned earlier, the magnets 4 and 5, in addition to providing a strong magnetic field at the recording gap, also present a lesser magnetic field which serves to attract excess accumulated toner powder present at the recording region toward the magnets 4 and 5. In the prior known apparatus of the type just described, such excess toner that is attracted by the magnets 4 and 5 is removed for later use by a vacuum pull-off system, a mechanical auger or belt skiving mechanism. These toner removal arrangements have been found to be overly complex and abrasive on the toner. The improvement made to the apparatus that has been described resides in the apparatus provided for removing the excess toner that is attracted toward the magnets 4 and 5. Such apparatus includes a sleeve or cylindrical member 13 which surrounds the magnet 4. The sleeve 13 is adapted for rotation. Rotation in a counterclockwise direction as viewed in FIG. 1 is preferred. A similar sleeve or cylindrical member 14 is also positioned about the magnet 5 and is adapted for rotation with the preferred rotation being in a clockwise direction. A magnetic shunt member 15, which can be formed from a ferromagnetic material, such as cold-drawn steel, is also contained within the sleeve 13 and is bonded to the magnet 4 on the side of the magnet 4 that is away from the electrode 1. The member 15 serves as a toner removal means as it reduces the degree to which the toner is attracted to the sleeve 13 to the degree that most of the toner will fall by gravity from sleeve 13 when the toner reaches the area opposite the ferromagnetic member. A toner remover blade 16 can be positioned next to the sleeve 13 at a point where the magnetic field due to magnet 4 is at a minimal level to assist in the removal of toner from sleeve 13. The magnetic shunt member 15 need not be used with only the toner removal blade 16 then used to remove toner from sleeve 13. The portion of excess toner in the recording region which is attracted toward the magnet 4 is carried away from the recording region by the counterclockwise rotation of the sleeve 13 bringing it to the toner remover blade 16 where it then falls to the toner powder hopper 6. The portion of the excess toner that is attracted toward the magnet 5 is carried along the surface of the sleeve 14 away from the recording region by the clockwise rotation of the sleeve 14. A relatively very small amount of non-image or background toner may remain on the surface of the recording member 3 as it moves away from the recording region. Such non-image toner is held to the recording member 3 by a much weaker force than the image toner 17. An additional toner removal means 18 is provided to remove such non-image or background toner. The toner removal means 18 is positioned a short distance from the recording member 3 and a short distance from the sleeve 14. It includes a stationary sleeve member 19 with a number of sections of magnets 20 which are adapted for rotation within the sleeve 19. Clockwise rotation of magnets 20 is provided causing the toner that is attracted to the sleeve 19 by the magnetic field presented by the magnets 20 to move counterclockwise over the surface of the sleeve 19. The magnetic field presented by the magnets 20 also serves to attract toner that is carried on the sleeve 14 to the sleeve 19. The toner removal means 18 also includes a flange member 21 that is carried on the surface of the sleeve 19. One portion of the flange member 21 is mounted in a spiral fashion and extends from about the center of the longitudinal length of the sleeve 19 to one edge of the sleeve 19 with another portion of the flange member similarly arranged to extend to the other end of the sleeve 19. A chute 22 extending from a position near the toner hopper 6 to the flange portion at one end of the sleeve 19 provides a return pathway to the hopper 6 for the toner that is directed to the end of the sleeve 19 by the flange member 21. A similar chute 23 is provided for the portion of the flange structure 21 that extends to the other end of the sleeve 19 to provide a return pathway to the hopper 6 for toner collected by that portion of the flange structure 21. The toner removal means 18, thus, provides the apparatus needed for removing background toner from the recording member 3 and, in addition, removes toner that is collected on the sleeve 14 and with chutes 22 and 23 provides for the return of such toner to the hopper 6 for reuse by the apparatus.

Figure 3:
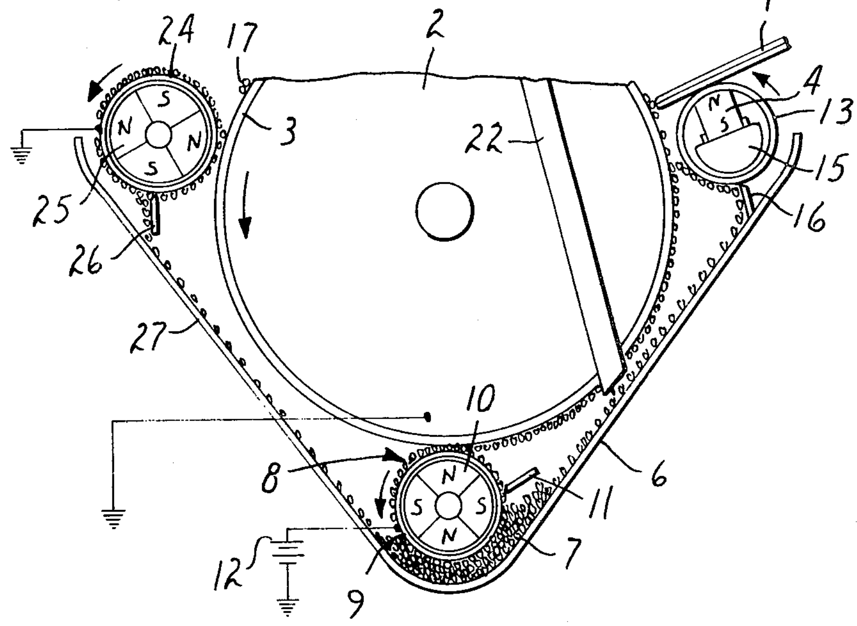
FIG. 3 is a diagrammatic showing of a modification of the apparatus of FIG. 1.

One use for the apparatus that has been described is to produce an image on the recording member 3 which is not transferred to another receptor. The toner image is normally removed from the receptor 3 by the toner powder transport means 8 at the hopper 6. As mentioned earlier, the dielectric material for the recording member 3 is selected to cause the charge that is present on the toner to discharge as the drum electrode 2 continues to rotate. For high speed operation of the apparatus that has been described, the charge on the toner or on the receptor member 3 may not be dissipated by the time it reaches the toner transport apparatus 8. As a precaution, however, an additional means can be provided for removing the toner and the charge from the receptor member 3 and returning the toner to the hopper 6. The modification to the apparatus of FIG. 1 that is required to provide this additional toner removal structure is shown in FIG. 3. The structure is similar to the toner transport mechanism 8 and includes a sleeve 24 positioned adjacent to the receptor member 3 and above the toner hopper 6. A plurality of magnets 25, similar to the magnets 10 for the toner transport mechanism 8, is positioned within the sleeve 24. The sleeve 24 is connected to ground. A toner removal blade 26 is positioned adjacent the sleeve 24. A chute 27 is provided below the toner removal blade 26 to receive toner removed by the blade 26 and extends to the toner hopper 6. When the apparatus is placed in operation, the sleeve 24 has toner attracted to it by the magnets 25 and carries such toner to the toner removal blade 26 where it is removed and returned to the hopper 6 by the chute 27.

While FIGS. 1 and 2 illustrate a preferred form of the apparatus, it should be appreciated that the apparatus can be simplified. It is possible to use only one of the magnets 4 and 5 so one alternative structure or embodiment would be in accordance with the structure of FIGS. 1 and 2 with magnet 5 and sleeve member 14 eliminated. The toner removal means 18 would remain and serve to remove non-image toner from the receptor 3 as it is moved past the sleeve member 19. A further usable embodiment would be in accordance with the structure of FIGS. 1 and 2 with magnet 4 and sleeve member 13 and the associated toner removal means eliminated.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

What is claimed is:

1. An improved electrographic apparatus for use with magnetically attractable, electronically conductive toner powder, the electrographic apparatus including: first and second electrodes in spaced opposing relationship; a receptor recording member spaced from the first electrode for providing a recording region between the first electrode and the receptor recording member, the receptor recording member adapted for making electronic contact with the second electrode and for movement past said first electrode; a hopper for holding a supply of toner powder from which a regular or relatively uniform supply of toner is provided to the recording region; a magnet disposed adjacent one side of the first electrode establishing a magnetic field at the first electrode to attract toner powder toward said first electrode, the magnet also attracting toner powder presented adjacent the recording region; the improvement including:

a first sleeve member of non-magnetic material disposed about the magnet and adapted for rotation to carry toner powder attracted toward the magnet away from said recording region;

a toner powder removal means including a second sleeve member of non-magnetic material and a magnetic field producing means disposed within said second sleeve member and adapted for rotation, said second sleeve member positioned close to the receptor recording member and close to said first sleeve member to cause said magnetic field producing means to attract toner powder that is loosely carried by said receptor recording member to said second sleeve member and attract toner powder carried by said first sleeve member to said second sleeve member and move such toner attracted to said second sleeve over the surface of said second sleeve member.

2. An improved electrographic recording apparatus according to claim 1 wherein said toner powder removal means further includes a flange means spirally disposed at the outer surface of said second sleeve and extending to at least one end portion of said second sleeve for receiving toner powder that is moved over the surface of said second sleeve member; and a pathway means positioned between the hopper and said flange means at said one end portion of said second sleeve providing a pathway for toner powder brought to said flange means to fall by gravity from said flange means at said one end portion of said third sleeve to the hopper.

3. An improved electrographic apparatus for use with magnetically attractable, electronically conductive toner powder, the electrographic apparatus including: first and second electrodes in spaced opposing relationship; a receptor recording member spaced from the first electrode for providing a recording region between the first electrode and the receptor recording member, the receptor recording member adapted for making electronic contact with the second electrode and for movement past said first electrode; a hopper for holding a supply of toner powder from which a regular or relatively uniform supply of toner is provided to the recording region; a first magnet disposed adjacent one side of the first electrode; a second magnet disposed opposite the first magnet and adjacent the other side of the first electrode; the first and second magnets establishing a magnetic field at the first electrode to attract toner powder toward said first electrode, the magnets also attracting toner powder presented adjacent the recording region toward said first and second magnets; the improvement including:

a first sleeve member of non-magnetic material disposed about the first magnet and adapted for rotation to carry toner powder that is attracted toward the first magnet away from said recording region;

a toner powder removal means for removing toner powder from said first sleeve member;

a second sleeve member of non-magnetic material disposed about the second magnet and adapted for rotation to carry toner attracted toward the second magnet away from the recording region;

a third sleeve member of non-magnetic material positioned a short distance from said second sleeve member;

a magnetic field producing means disposed within said third sleeve member and adapted for rotation, said magnetic field producing means attracting toner powder carried by said second sleeve member to said third sleeve member and moving it over the surface of said third sleeve member; and a toner powder removal means for removing toner powder from said third sleeve member.

4. An improved electrographic recording apparatus according to claim 3 wherein said third sleeve member is also positioned close to the receptor recording member to cause said magnetic field producing means to attract toner powder that is loosely carried by said receptor recording member to said third sleeve member.

5. An improved electrographic recording apparatus according to claim 3 wherein said first-mentioned toner powder removal means is a blade member positioned near said first sleeve member.

6. An improved electrographic apparatus according to claim 3 wherein said first-mentioned toner powder removal means includes a blade member positioned near said sleeve and a magnetic shunt member for the first magnet.

7. An improved electrographic apparatus according to claim 3 wherein said first-mentioned toner powder removal means includes a magnetic shunt member for the first magnet.

8. An improved electrographic recording apparatus according to claim 3 wherein said last-mentioned toner powder removal means includes a flange means spirally disposed at the outer surface of said third sleeve member and extending to at least one end portion of said third sleeve member for receiving toner powder that is moved over the surface of said third sleeve member; and pathway means positioned between the hopper and said flange means at said one end portion of said third sleeve providing a pathway for toner powder brought to said flange means to fall by gravity from said flange means at said one end portion of said third sleeve member to the hopper.

* * * * *